United States Patent
Furukawa et al.

[11] Patent Number: 5,904,801
[45] Date of Patent: May 18, 1999

[54] APPARATUS FOR SETTING A GAP BETWEEN GLASS SUBSTRATES

[75] Inventors: Kyouji Furukawa, Toyokawa; Shigeyuki Takagi; Takashi Kondou, both of Toyohashi, all of Japan

[73] Assignee: Sintokogio, Ltd., Nagoya, Japan

[21] Appl. No.: 08/883,678

[22] Filed: Jun. 27, 1997

[30] Foreign Application Priority Data

Jun. 28, 1996 [JP] Japan ................................. 8-188802
Jul. 26, 1996 [JP] Japan ................................. 8-215293
Apr. 4, 1997 [JP] Japan ................................. 9-102539

[51] Int. Cl.⁶ ................................................. B32B 31/00
[52] U.S. Cl. ........................... 156/382; 156/105; 156/107; 156/580; 156/286
[58] Field of Search ........................... 156/99, 104, 105, 156/107, 285, 381, 382, 580, 286

[56] References Cited

U.S. PATENT DOCUMENTS

| | | | |
|---|---|---|---|
| 5,116,216 | 5/1992 | Cochran et al. | 425/504 |
| 5,242,651 | 9/1993 | Brayden et al. | 264/510 |
| 5,261,993 | 11/1993 | Dahlgren | 156/382 |
| 5,365,656 | 11/1994 | Dahlringer et al. | 29/840 |
| 5,507,896 | 4/1996 | Yoshimura et al. | 156/89 |
| 5,705,006 | 1/1998 | Roudebush et al. | 156/98 |
| 5,716,488 | 2/1998 | Bryant | 156/382 |

FOREIGN PATENT DOCUMENTS 3-4888 1/1991 Japan.
8-26788 1/1996 Japan.

*Primary Examiner*—James Sells
*Attorney, Agent, or Firm*—Limbach & Limbach L.L.P.

[57] ABSTRACT

An apparatus for setting a gap of a glass panel (W) having two glass substrates (20, 21) is disclosed. It includes an annular spacer (12) for surrounding the glass panel (W), a supporting plate (11) for supporting the glass panel and the annular spacer, the width of the supporting plate being greater than that of the annular spacer, a pair of opposing columns (2, 2A) for receiving the supporting plate (11), a flexible sheet (14) disposed on the annular spacer, the width of the sheet being greater than that of the annular spacer so as to be associated with the supporting plate to enclose the glass panel, means (13, 15, 16) for defining a closed space between the supporting plate (11) and the flexible sheet (14), a passage (8) in fluid communication with the closed space, and means (9) connected to the passage for evacuating the closed space.

12 Claims, 2 Drawing Sheets

APPARATUS FOR SETTING A GAP BETWEEN GLASS SUBSTRATES

FIELD OF THE INVENTION

This invention relates to an apparatus for setting a uniform gap of a liquid crystal panel by pressing it by the evacuation method. The panel is comprised of two glass substrates that have transparent electrodes on their inner surfaces and a thermo-setting resin therebetween. In this invention the term "a glass substrate" means a substrate made of glass or other material (such as a plastic) suitable for a liquid crystal panel. Also, the term "glass panel" means a panel made of such glass substrates.

DESCRIPTION OF THE PRIOR ART

Japanese Patent Laying-Open Publication No. 8-26788 discloses an apparatus for setting a gap of a glass panel by the evacuation method. In this apparatus gaskets are disposed on and under the glass panel to prevent the glass substrates from shifting. However, since the glass panel is supported at its periphery by the gaskets, the panel tends to deflect due to its weight, thereby causing the glass substrates to shift. Further, since the glass panel itself acts as a part of the apparatus, the apparatus can be used only for glass panels of a definite size. Therefore apparatuses of different sizes must be used for glass panels of different sizes.

Japanese Patent Publication No. 3-4888 teaches an apparatus for setting a gap of a liquid crystal panel by the evacuation method to indirectly press it. Although in this apparatus a buffer is disposed under the lower surface of the panel, the rate of thermal expansion of a flexible sheet, which contacts the upper surface of the panel, and the rate of thermal expansion of a mold, which contacts the lower surface of it, differ due to heaters embedded in the mold. Thus the forces which confine the upper and lower glass substrates differ, thereby allowing them to have differing rates of expansion. This causes them to shift.

SUMMARY OF THE INVENTION

This invention aims to provide an apparatus for setting gaps of glass panels of different sizes wherein the relative shift of the glass substrates is prevented.

To the above end, the apparatus of the present invention for setting a gap of a glass panel having two glass substrates includes an annular spacer for surrounding the glass panel, a supporting plate for supporting the glass panel and the annular spacer, the width of the supporting plate being greater than that of the annular spacer, a pair of opposing columns for receiving the supporting plate, a flexible sheet disposed on the annular spacer, the width of the sheet being greater than that of the annular spacer so as to be associated with the supporting plate to enclose the glass panel, means for defining a closed space between the supporting plate and the flexible sheet, a passage in fluid communication with the closed space, and means connected to the passage for evacuating the closed space. When the gap of a large or small glass panel is adjusted, the annular spacer is changed to a small or large one.

Preferably, the passage is disposed outside the annular spacer and the spacer has a notch therein as a passage through which the closed space is evacuated by the evacuating means. Further, preferably, a rigid plate is disposed between the flexible sheet and the glass plate or between the glass plate and the supporting plate, or both.

Purposes and advantages other than the above will be clear from the below embodiments and accompanying drawings.

DESCRIPTION OF THE PREFERRED EMBODIMENTS

Figure 1:
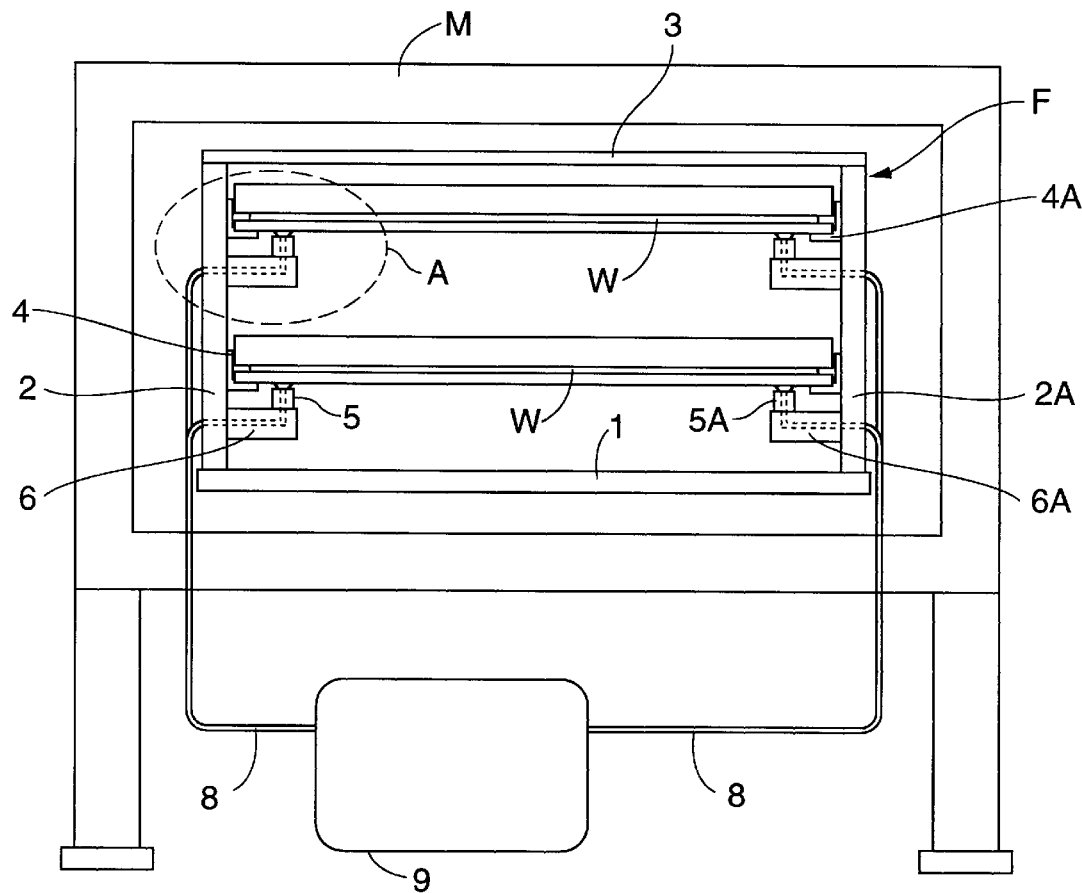
FIG. 1 is a schematic front view of one embodiment of the apparatus of the present invention.
Figure 2:
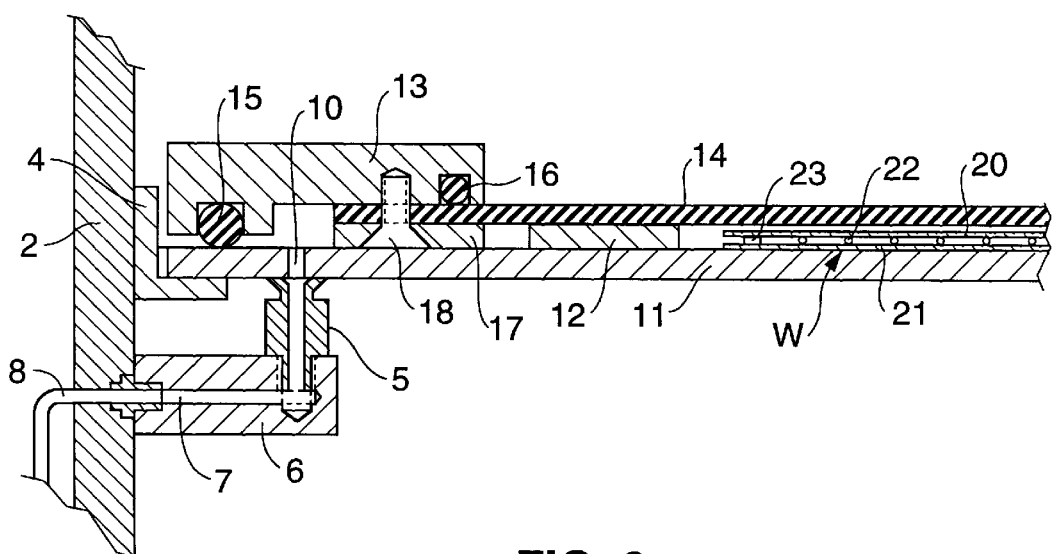
FIG. 2 is a cross-sectional view in an enlarged scale of the part A in FIG. 1.

In FIGS. 1 and 2 an oven with internal air circulation M is disposed. Outside the oven M a frame F is disposed. The frame F has a pair of aluminum opposing columns 2, 2A installed on a floor near the oven M, and a tie beam 3 connecting the columns 2, 2A. As in FIG. 1, two glass panels (upper and lower panels) are supported by the frame in two levels. The structure of each level is the same. Thus the structure of the upper level, especially the structure of a portion A of the upper level, will now be explained.

A pair of brackets 4, 4A are secured to the columns 2, 2A. The brackets 4, 4A are long enough to receive a ceramic supporting plate 11. A pair of brackets 6, 6A are also secured to the columns 2, 2A. A silicon suction pad 5 (5A) is attached to the distal end of each bracket 6 (6A) such that the level (initial position) of the top of the bracket 6 (6A) is slightly higher than that of the bottom of the supporting plate 11 (higher than the level of the top of the supporting-plate-receiving portion of the bracket 4). Thus when the supporting plate 11 is put on the brackets 4, 4A, its bottom is pressed against the suction pad 5, and therefore the pad is deformed, so that its level becomes equal to that of the bottom of the supporting plate 11. The supporting plate 11 has suction throughbores 10, 10A, each of which is connected to one end of a passage 7 formed in the pad 5 and bracket 6. The other end 8 of the passage 7 is connected to a vacuum pump 9 (FIG. 1). The glass panel W is placed on the supporting plate 11. The glass panel W includes upper and lower glass substrates 20, 21, which are spaced apart by spherical spacer blocks 22. A thermo-setting sealer 23 is applied to the inner periphery of the glass substrates 20, 21. An aluminum annular spacer 12 is disposed on the supporting plate 11 so that it surrounds the glass panel W. The spacer 12 is formed in a size (width) suitable for the glass panel W of a definite size, and it has a thickness slightly greater than that of the glass panel W. The thickness of the spacer 12 may be in a range of plus or minus 0.5 mm of the thickness of the glass panel. The spacer 12 has notches (not shown) therein which act as suction passages.

A flexible, heat-resistant silicon-rubber sheet or fluororubber sheet 14, which has a width greater than that of the annular spacer 12, is put on the annular spacer 12 so that it encloses the glass panel W with the associated supporting plate 11. The flexible sheet 14 is secured to an annular sealing block 13 by a plurality of vises 18 and beads 17. Annular sealing gaskets 15, 16 are embedded in the sealing block 13 to seal or to define a closed space between the flexible sheet 14 and supporting plate 11.

When the closed space between the flexible sheet 14 and the supporting plate 11 (including the space between the glass substrates) is evacuated, the flexible sheet 14 is pressed against the glass panel W, to thereby set a gap. When the closed space is evacuated to a predetermined degree, the apparatus and the glass panel are moved into the oven M and are heated (at a temperature of 150° C.) for a predetermined period of time (one to two hours), so that the sealer 23 hardens.

The apparatus and the glass panel are moved out of the oven M and cooled to the ambient temperature. Then the evacuation is stopped, and the flexible sheet 14 is removed. Thus the gap-setting is completed. (In some cases the evacuation may be stopped before the panel is cooled.)

When the gap of a panel having a small width is adjusted, another annular spacer having a small width is used so as not to make a large space between the spacer and the glass panel. If a large space were made, the flexible sheet 14 would contact the supporting plate 11, thereby preventing the evacuation.

In the first embodiment, shown in FIGS. 1 and 2, the suction pad 5 is disposed under the supporting plate 11 and connected to the throughbore 10 formed in the plate 11. This arrangement may be changed so that a suction throughbore is formed in the annular sealing block 13, and so that the suction pad 5 and the bracket 6 are disposed above the block 13 so that the passage 7 is in fluid communication with the closed space between the flexible sheet 14 and the supporting plate 11.

Figure 3:
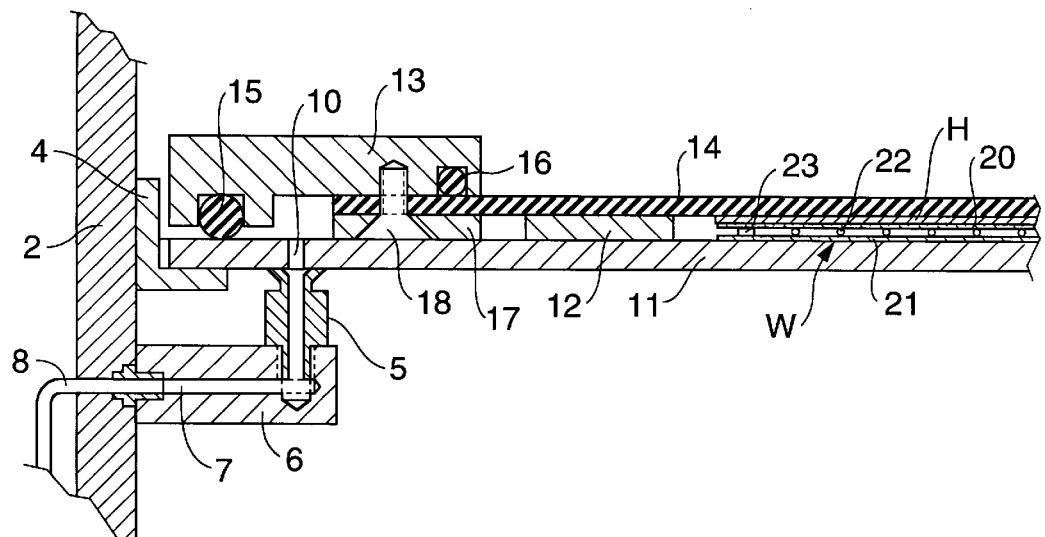
FIG. 3 is a view similar to FIG. 2, showing an additional press plate.

FIG. 3 shows a second embodiment of the apparatus of the invention. In this embodiment an additional press plate H is used. Other elements are the same or similar to those in the first embodiment. Thus the same reference numbers and letters are used for those elements.

The press plate H is made of a rigid and plane ceramic having sufficient thermal conductivity. Thus when the glass panel W is put in the oven M, heat is well transmitted to the panel through the ceramic supporting plate 11 and the press plate H. Further, since the press plate H is plane, the atmospheric pressure uniformly presses the panel W through the press plate H. As in the first embodiment, the thickness of the annular spacer 12 is slightly greater than the total thickness of the glass panel W and the press plate H. However, the thickness of the spacer 12 may be within a range of plus or minus 0.5 mm of the total thickness of the glass panel and the press plate. The gap-setting procedure will be carried out as in the first embodiment.

Figure 4:
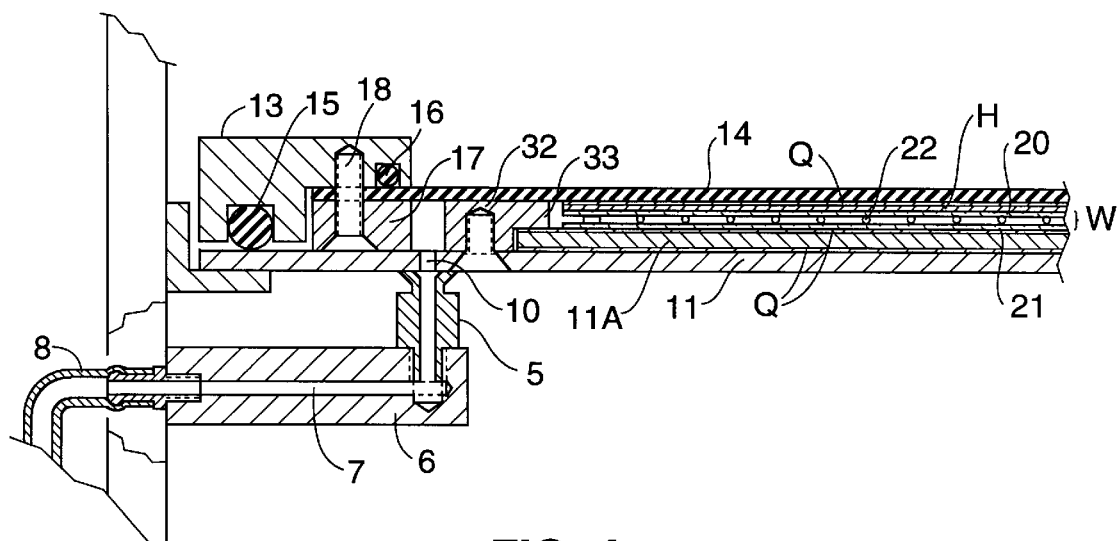
FIG. 4 is also a view similar to FIG. 2, showing additional rigid plates.

FIG. 4 shows a third embodiment of the apparatus of the present invention. In this embodiment the annular spacer, which is denoted by the number 32, is modified, and an additional press plate H and holding plate 11A are used. Other elements are the same as in the first embodiment, and the same reference numbers and letters are used for them.

The press plate H has the same size as that of the glass panel W. The press plate is plane and rigid and made of a material having thermal conductivity. Preferably, it may be ceramic or glass, each of which has a rate of thermal expansion nearly equal to that of the glass panel. As far as the rate of thermal expansion is concerned, any material having a rate within a range of 0.05–3 times that of glass may be used. Thus stainless steel and aluminum alloys may be used if they are within that range.

The holding plate 11A is made of a rigid, plane, and heat-conductive material such as glass or a ceramic. The holding plate 11A may be made of the a* same material as the press plate H. The annular spacer 32 is affixed to the supporting plate 11 by vises as in the drawing. It is affixed after the holding plate 11A is put on the supporting plate 11. The annular spacer 32 is notched at the inner, lower part so that it has a horizontally extending portion 33 to hold the holding plate 11A. When the closed space between the flexible sheet 14 and the supporting plate 11 is evacuated, the glass panel W is pressed between the fixed, rigid holding plate 11A and the rigid press plate H. Thus the atmospheric pressure is uniformly applied to the panel W. When the glass panel W is put in the oven M, the heat is well transmitted to the panel through the ceramic supporting plate 11, holding plate 11A, and press plate H.

To lessen the frictional resistance between the press plate H and the glass panel W, between the glass panel W and the holding plate 11A, and between the holding plate 11A and the supporting plate 11, intermediate sheets Q are disposed therebetween. Preferably, each sheet Q is heat-resistant. For example, it may be a sheet of fluoro-resin, silicon rubber, glass cloth or fluoro-resin impregnated glass cloth, or a porous sheet of any fluoro-resin. Each sheet Q may be merely inserted between the plates, or it may be glued to them by means of an adhesive. In this embodiment the thickness (height) of the lower portion (retracted portion) of the annular spacer 32 is slightly greater (by about 0.2 mm) than the total thickness of the holding plate 11A and the intermediate sheet Q. The thickness of the extending portion 33 of the spacer 32 is slightly greater than the total thickness of the glass panel W, the press plate H, and the intermediate sheets Q. However, it may be within a range of plus or minus 1.0 mm of the total thickness. The gap-setting procedure will be carried out as in the first embodiment.

When a small glass panel is treated, an annular spacer is used which extends inward further than shown in the drawing.

The supporting plate may be of metal or a laminated plate of glass cloth layers or aramid cloth layers, or both, in which heat-resistant material is impregnated.

One skilled in the art will appreciate that the present invention can be practiced with embodiments other than the described ones, which are presented for the purpose of illustration and not of limitation, and that the present invention is limited only by the claims that follow.

What we claim is:

1. An apparatus for setting a gap of a glass panel having two glass substrates, comprising:

an annular spacer for surrounding the glass panel;

a supporting plate for supporting the glass panel and the annular spacer, the width of the supporting plate being greater than that of the annular spacer;

a pair of opposing columns for receiving the supporting plate;

a flexible sheet disposed on the annular spacer, the width of the sheet being greater than that of the annular spacer so as to be associated with the supporting plate to enclose the glass panel;

means for defining a closed space between the supporting plate and the flexible sheet;

a passage in fluid communication with the closed space; and means connected to the passage for evacuating the closed space.

2. The apparatus of claim 1, wherein the apparatus further includes a heat-conductive press plate disposed within the annular spacer and between the flexible sheet and the glass panel.

3. The apparatus of claim 1, wherein the passage is disposed outside the annular spacer, and the annular spacer has a passage therein.

4. The apparatus of claim 1, the means for defining the closed space including a suction pad which is pressed against the means for defining the closed space or the supporting plate, and the passage in fluid communication with the closed space being disposed in the suction pad.

5. The apparatus of claim 4, wherein the suction pad is disposed under the supporting plate, and wherein the initial level of the top of the suction pad is located slightly above the bottom of the supporting plate.

6. An apparatus for setting a gap of a glass panel having two glass substrates, comprising:

a heat-resistant and rigid holding plate for receiving the glass panel;

an annular spacer for surrounding the holding plate and the glass panel;

a supporting plate for supporting the glass panel, the holding plate, and the annular spacer, the width of the supporting plate being greater than that of the annular spacer;

a pair of opposing columns for receiving the supporting plate;

a press plate disposed on the glass panel so as to be associated with the holding plate to press the glass panel;

a flexible sheet disposed on the annular spacer and the glass panel, the width of the sheet being greater than that of the annular spacer so as to be associated with the supporting plate to enclose the glass panel;

means for defining a closed space between the supporting plate and the flexible sheet;

a passage in fluid communication with the closed space; and means connected to the passage for evacuating the closed space.

7. The apparatus of claim 6, wherein the annular spacer has an extending portion that holds the glass panel.

8. The apparatus of claim 6, wherein the holding plate and the press plate have a rate of thermal expansion that is 0.05–3 times that of the glass panel.

9. The apparatus of claim 6, further including intermediate sheets disposed between the press plate and the glass panel and between the glass panel and the holding plate.

10. The apparatus of claim 9, wherein each intermediate sheet is any one of a fluoro-resin sheet, silicon-rubber sheet, glass-cloth sheet, fluoro-resin impregnated glass-cloth sheet, or porous fluoro-resin sheet.

11. The apparatus of claim 9, wherein the spacer has an upper extending portion and a lower portion, and wherein the lower portion has a thickness that is about 0.2 mm greater than the total thickness of the holding plate and the intermediate sheets.

12. The apparatus of claim 9, wherein the spacer has an upper extending portion, the upper extending portion having a thickness within a range of plus or minus 1 mm of the total thickness of the press plates and the intermediate sheets.

* * * * *